(12) United States Patent
Wong (10) Patent No.: US 6,976,313 B2
(45) Date of Patent: Dec. 20, 2005

(54) BATTERY-POWERED CARVING KNIFE HAVING A RECHARGEABLE BATTERY PACK

(75) Inventor: Steve Wong, Kowloon Bay (CN)

(73) Assignee: International Concepts, Inc., St. Joseph, MI (US)

( * ) Notice: Subject to any disclaimer, the term of this patent is extended or adjusted under 35 U.S.C. 154(b) by 0 days.

(21) Appl. No.: 10/242,889

(22) Filed: Sep. 13, 2002

(65) Prior Publication Data

US 2003/0192191 A1 Oct. 16, 2003

Related U.S. Application Data

(63) Continuation-in-part of application No. 10/122,887, filed on Apr. 15, 2002.

(51) Int. Cl.[7] .............................................. B23D 49/10
(52) U.S. Cl. .............................. 30/369; 30/392; 30/501
(58) Field of Search ........................ 30/392–394, 277.4, 30/369, 501, 503

(56) References Cited

U.S. PATENT DOCUMENTS

| | | | |
|---|---|---|---|
| 1,324,032 A | 12/1919 | Buell et al. | |
| 1,775,692 A | 9/1930 | Plut | |
| 3,212,188 A * | 10/1965 | Riley, Jr. | 30/216 |
| 3,337,954 A | 8/1967 | Robison | |
| 3,432,702 A | 3/1969 | Chambers | |
| 3,533,600 A | 10/1970 | Gerson | |
| 3,664,021 A * | 5/1972 | Sawyer | 30/277.4 |
| 3,679,958 A | 7/1972 | Chambers | |
| 3,883,789 A * | 5/1975 | Achenbach et al. | 429/9 |
| 3,934,340 A | 1/1976 | Jones et al. | |
| 4,104,795 A | 8/1978 | Lopic | |
| 4,191,917 A | 3/1980 | Brown et al. | |
| 4,458,421 A | 7/1984 | Lew | |
| 4,631,827 A | 12/1986 | Moores | |
| 4,891,884 A * | 1/1990 | Torbet | 30/277.4 |
| 5,099,705 A * | 3/1992 | Dravnieks | 74/50 |
| 5,130,892 A | 7/1992 | Satou | |
| 5,155,914 A * | 10/1992 | Ohkanda | 30/369 |
| 5,230,155 A | 7/1993 | Pai | |
| 5,314,762 A | 5/1994 | Hamada et al. | |
| 5,590,469 A | 1/1997 | Hoover et al. | |
| 5,597,225 A * | 1/1997 | Davis | 362/473 |
| 5,653,033 A | 8/1997 | McDowell | |
| 5,654,114 A | 8/1997 | Kubota et al. | |
| 5,685,080 A | 11/1997 | Amano et al. | |
| 5,728,118 A * | 3/1998 | Dross et al. | 606/171 |
| 5,736,271 A | 4/1998 | Cisar et al. | |
| 5,903,423 A | 5/1999 | Okano et al. | |
| 6,021,573 A * | 2/2000 | Kikuchi et al. | 30/392 |
| 6,341,425 B1 * | 1/2002 | Kahle | 30/277.4 |
| 6,434,836 B1 * | 8/2002 | Olivares | 30/277.4 |
| 6,487,779 B1 * | 12/2002 | Underthun | 30/277.4 |
| 6,640,445 B1 * | 11/2003 | Crawford | 30/277.4 |

* cited by examiner

Primary Examiner—Kenneth E. Peterson
(74) Attorney, Agent, or Firm—Baker & Daniels LLP (57) ABSTRACT

A battery-powered carving knife is shown having a housing and a switch, which connects and disconnects a battery to a motor. A drive mechanism including a worm gear together with a cam member causes reciprocation of reciprocating blade mounts to reciprocate back and forth in an out of phase fashion. The motor is positioned forward within the housing in motor receiving section, with the drive shaft of the motor facing rearwardly. The blade mounts are driven by the motor, and reciprocate in a position below the motor. The motor and blade mounts are positioned in front of a handgrip section, thereby improving the ergonomics of the device. Alternatively, the drive shaft can be positioned facing forward.

15 Claims, 9 Drawing Sheets

BATTERY-POWERED CARVING KNIFE HAVING A RECHARGEABLE BATTERY PACK

This application claims the benefit of U.S. patent application Ser. No. 10/122,887 filed Apr. 15, 2002, as a continuation-in-part.

BACKGROUND OF THE INVENTION

The invention relates to a battery-powered knife having reciprocating blades for carving or cutting.

It is well known in the industry of carving knives to include either electrically or battery-powered carving knives. Typically these carving knives include a housing or casing to house the motor, and include a drive mechanism which includes means for driving a pair of carving knife blades in a reciprocating manner such that the knives are 180° out of phase. This back and forth reciprocation of the blades assists in the carving process. Such carving knives are typically used for home use for carving of meats of various sorts, but such knives can also be used for cleaning and preparation of fish. One of the drawbacks to existing products, whether electrically driven or battery-powered, is that the motor is located in the housing in a position such that the motor and/or the battery forms a counterweight to the knife blades, such that the weight must be counteracted by the user by a further carving force to enable the meat to be cut. This provides for a device which is not very ergonomically pleasing to the user and feels very awkward during such use.

Take for example U.S. Pat. Nos. 3,337,954; 3,432,702; and 3,679,958. All of these mechanisms show a very heavy weight in the area where the casing would be gripped by the user as well as provide a very bulky handgrip for such use. Yet further the device is not very compact as the motor includes the gear drive facing forward which causes a serial arrangement of the components, that is, the batteries-motor-gear drive-knife, causing a stack up of dimensions resulting in an elongate and bulky end product.

One design, shown in U.S. Pat. No. 5,230,155 shows a motor having the drive shaft facing rearward, but once again the weight distribution is not optimum, as the motor is placed midway within the housing as an extendable and retractable knife assembly is positioned at the front part of the housing. This not only causes a weight distribution issue, but also provides a very bulky handgrip section making the design difficult for the user.

The objects of the invention then are to improve upon the shortcomings of the prior art.

The invention will now be described by way of drawing figures where.

SUMMARY OF THE INVENTION

The objects of the invention have been accomplished by providing an electric carving knife for driving a pair of carving knife blades, where the knife comprises a housing having a front motor receiving section and a rear handgrip section, the handgrip section having a reduced cross-section as compared to the front motor receiving section. A motor is positioned in the front motor receiving section, having a drive shaft extending rearwardly in the general direction as the rear handgrip section. A drive mechanism is connected to the motor drive shaft, and including a gear drive train to impart a reciprocating motion to the blades such that the knife blades are driven asymmetrically. Preferably, the electric carving knife blades are driven 180° out of phase.

Also preferably, the drive gear train comprises a worm gear attached to and driven by the motor drive shaft, a cam member drive by the worm gear, and reciprocating blade mounts which are driven by the cam member. The worm gear is attached to the motor drive shaft and rotates about a longitudinal axis. The cam member is comprised of a spur gear meshing with the worm gear, and rotates about an axis transverse with the longitudinal axis. The cam member includes cam lobes positioned on opposite sides of the spur gear, the cam lobes being eccentric relative to the transverse axis and 180° out of phase relative to each other. The reciprocating blade mounts are substantially L-shaped to include an upstanding foot portion and an elongate leg portion, the upstanding foot portions having elongate slots which overlap the cam lobes. The elongate leg portions of the reciprocating blade mounts extend forwardly and include blade mounting sections situated adjacent the forward section of the front motor receiving section, and the front motor receiving section including an access opening, accessing the blade mounting sections. The front motor receiving section includes upper arcuate outer walls profiled to surround the motor, and tapered walls surrounding the reciprocating blade mounts. The handgrip section includes a battery receiving cavity for the receipt of a battery.

In another embodiment of the invention, the motor has a drive shaft extending forwardly in the direction of the knife blades. The drive gear train is situated forward of the motor and includes substantially L-shaped reciprocating blade mounts having rearwardly facing elongate leg portions. The elongate leg portions have blade mounting sections situated adjacent the rearward section of the motor receiving section as previously described.

Both embodiments of the invention include preferably a battery pack having a compact design. The battery pack includes six individual Nickel Metal Hydride (Ni—MH) batteries enclosed in shrink wrapping and connected in series. The individual batteries are arranged within the battery pack forming a triangular cross-section with the positive ends of a group of three individual batteries arranged with a triangular cross-section abutting the negative ends of the remaining three individual batteries also arranged with a triangular cross-section. The electrical connection between the six individual batteries is such that the battery pack may be recharged from an external power source when the energy contained therein is substantially depleted.

DETAILED DESCRIPTION OF THE PREFERRED EMBODIMENT

Figure 1:
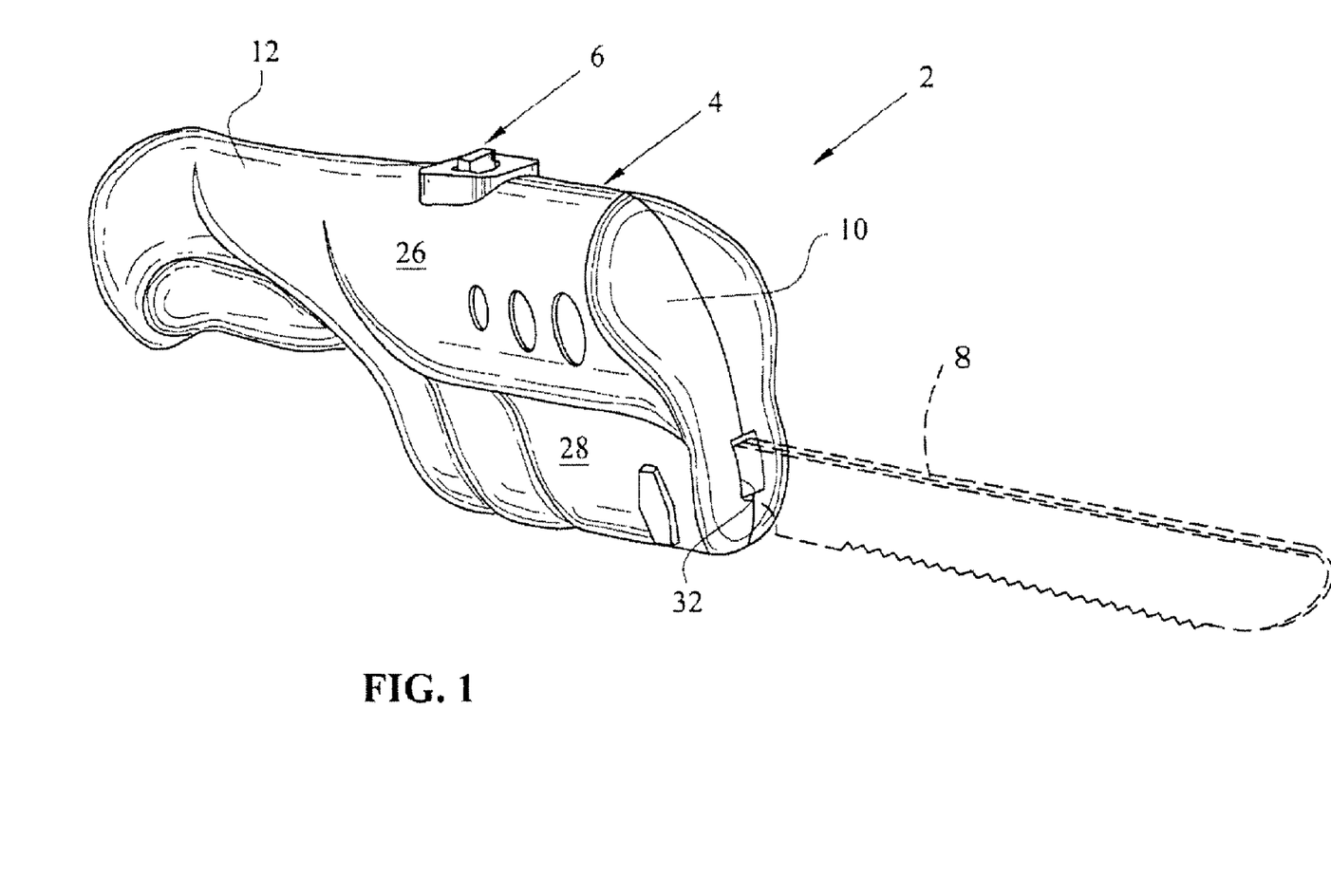
FIG. 1 is a perspective view of the carving knife of the present invention.

With reference first to FIG. 1, a battery-powered carving knife is shown generally at reference numeral 2 which includes a housing member 4 having a power switch at 6 to provide power to reciprocating knife blades shown at 8. The housing 4 generally includes a front motor receiving section 10 and a handgrip section at 12. With respect to FIG. 2, the carving knife 2 further generally comprises a motor at 14, driven by battery pack 16, which, as mentioned before, has intermediate power switch 6 for engaging or disengaging the motor 14. In the preferred embodiment of the invention, battery pack 16 is a nickel metal hydride (Ni—MH) battery pack; six batteries total, with three stacks of two batteries and is described in greater detail herein below. The carving knife 2 further includes a cam member 18, and reciprocating blade mounts at 20 which reciprocate within guide members 22. Cam 18 is held in place about a rotational axis by a bracket 24.

Figure 2:
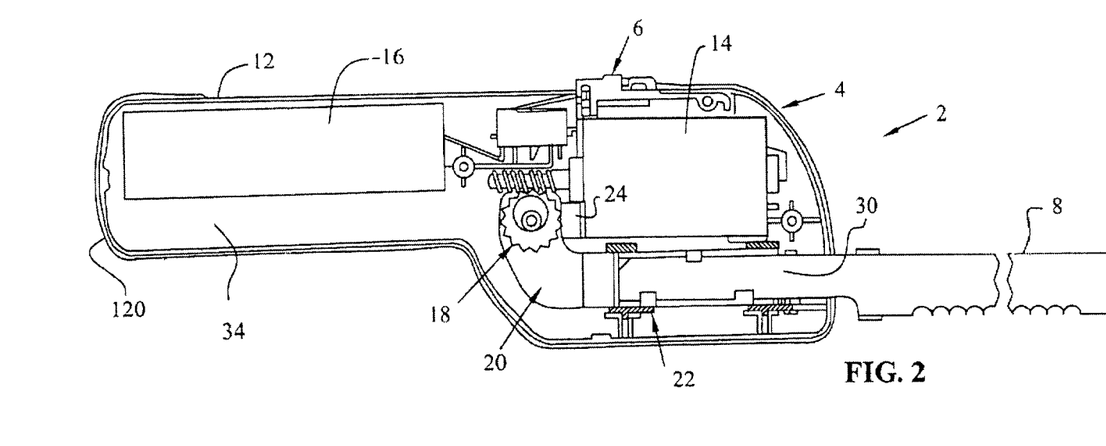
FIG. 2 is a view of the carving knife of FIG. 1 with one-half of the outer housing cover removed, and partially in section.

With reference now to FIGS. 1 and 2, the housing member 4 will be described in greater detail. As shown in FIG. 1, the housing 4, and in particular the motor receiving section 10, includes outer arcuate surfaces 26 profiled so as to receive motor 14. The housing 4 also includes tapered walls 28 which neck down to define a narrower section of the housing 4 which are profiled so as to receive the reciprocating blade mounts 20 as well as end section 30 of the knife 8. As shown best in FIG. 1, an opening 32 is provided at the front end of the housing 4 to receive the reciprocating blades 8. As shown in FIG. 2, the housing 4 includes a battery receiving section 34 within handgrip section 12 so as to retain battery pack 16. It should be appreciated that the handgrip section 12 is of a reduced cross section as compared to the motor receiving section 10.

Figure 3:
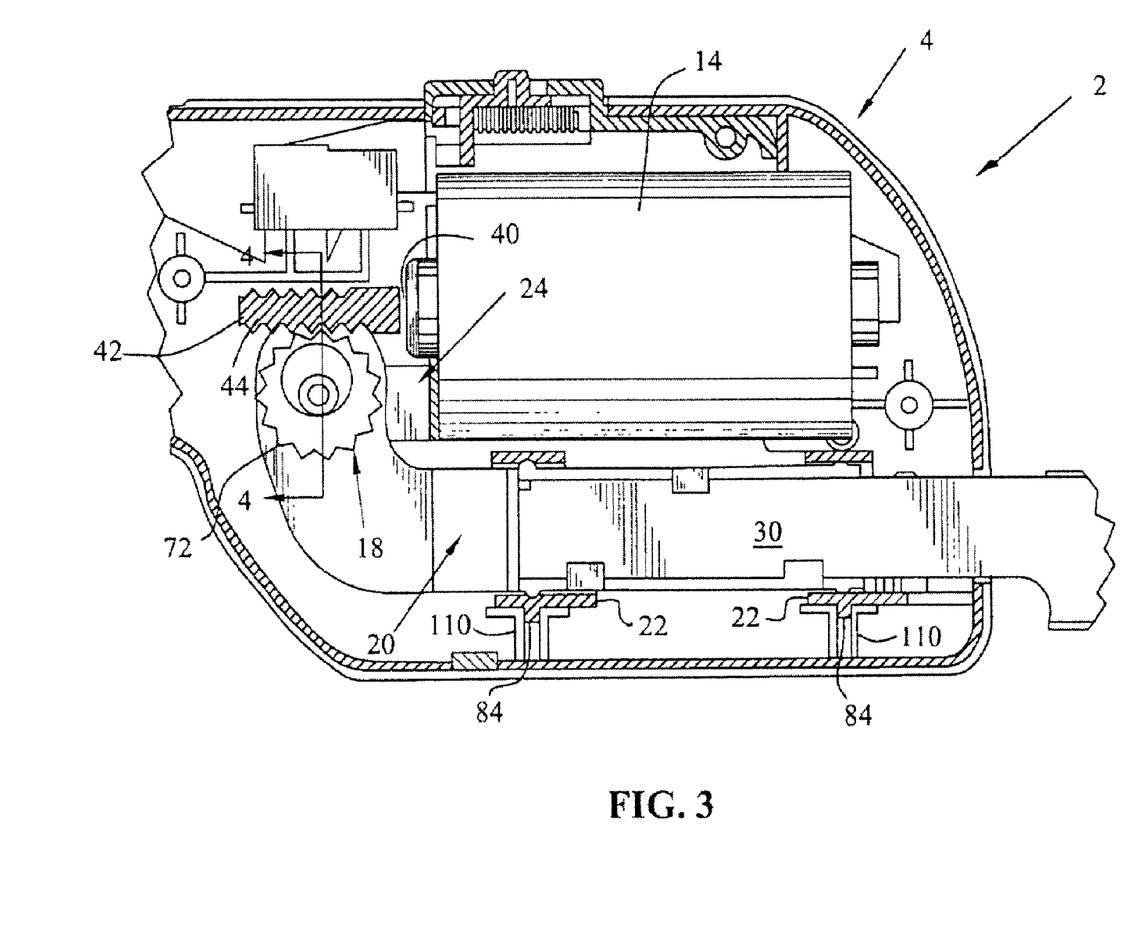
FIG. 3 is an enlarged view of the drive section of the carving knife of FIG. 2 partially in section.
Figure 7:
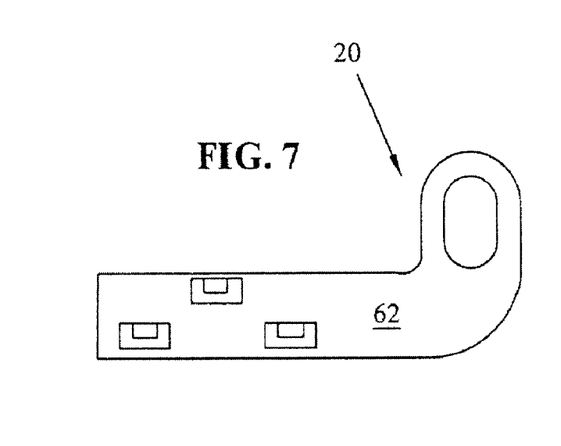
FIG. 7 is the back plan view of the reciprocating blade mount of FIG. 5.
Figure 8:
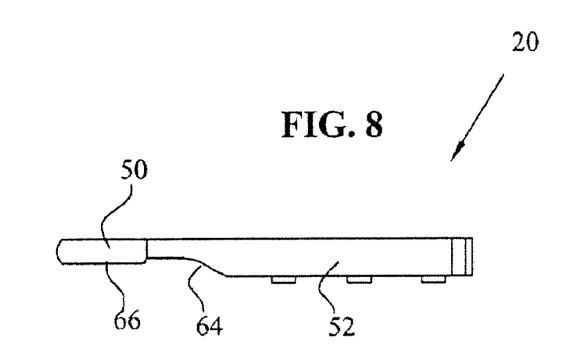
FIG. 8 is a top plan view of the reciprocating blade mount of FIG. 5.

With respect now to FIGS. 3–16, the drive train of the carving knife 2 will be described in greater detail. As shown in FIG. 3, motor 14 includes a drive shaft 40 which extends along a generally longitudinal axis and projects rearwardly towards battery pack 16. Drive shaft 40 includes a press fit worm gear 42 having a helical tooth at 44. With respect now to FIGS. 5–8, reciprocating blade mount 20 will be described in greater detail. The reciprocating blade mount 20 is substantially L-shaped, as shown in either of FIG. 5 or 7 to include an upstanding foot portion 50 and an elongate leg portion at 52. The upstanding foot portion 50 includes an elongate slot at 54 as will be described in further detail herein. The elongate leg portion 52 includes a blade receiving area at 56 having a slot 60 within the reciprocating blade mount 20. Leg portion 52 further includes spacing lugs at 58, 59 which will be described in greater detail. As shown in FIG. 7, the reciprocating blade mount 20 includes a back surface 62 which is substantially flat so as to cooperate with the guide member 22, as will be described herein. Finally, the blade mount 20 includes a tapered section at 64, which transitions from the elongate leg 52 to the foot section 50. Foot section 50 also includes a bearing surface at 66 to cooperate with cam member 18, as more fully discussed herein.

Figure 9:
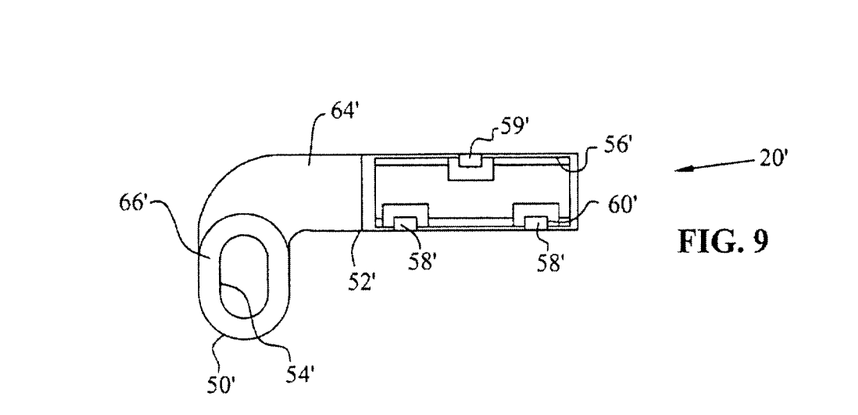
FIG. 9 is a side plan view of the right reciprocating blade mount.

With reference now to FIG. 9, the cooperating and right blade mount 20' is shown which is a mirror image of blade mount 20. Blade mount 20' includes a foot portion 50' connected to an elongate leg portion 52'. The foot portion 50' has an elongate slot and a blade receiving area at 56' including a blade receiving slot 60'. The leg portion 52' further includes spacing lugs 58'. It should be appreciated from a comparison of FIGS. 5 and 9, that the spacing lugs 58, 58' are profiled in a cooperating manner such that when the two legs 52, 52' are placed against each other, the single spacing lug 59 of leg 52 is positioned intermediate the two spacing lugs 58' of the leg 52'; and the single lug 59' of the leg 52' is spaced intermediate the two lugs 58 on leg 52.

Figure 10:
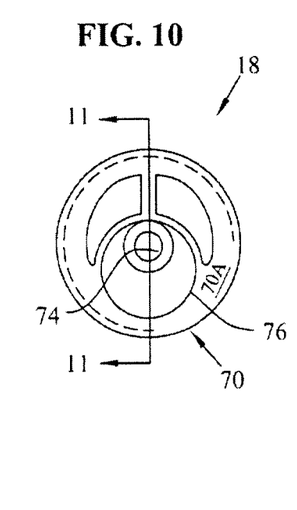
FIG. 10 is a front plan view of the gear-driven cam.
Figure 11:
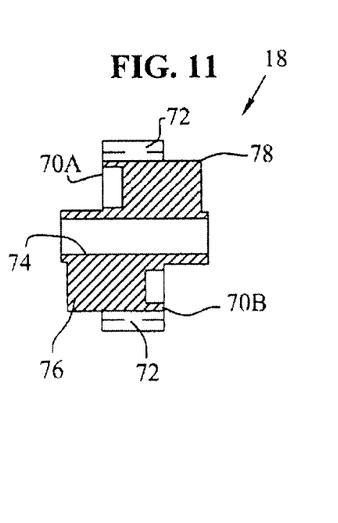
FIG. 11 is a cross-sectional view of the gear-driven cam through lines 11—11 of FIG. 10.
Figure 12:
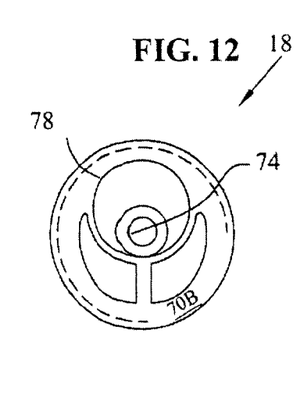
FIG. 12 is the back plan view of the gear-driven cam of FIG. 10.

With respect now to FIGS. 10–12, the cam member 18 will be described in greater detail. As shown first in FIG. 10, the cam member 18 includes a central spur gear portion 70, having gear teeth 72. The cam member 18 includes a central opening 74 about which it can rotate and cam lobes 76 and 78 being positioned on opposite sides of the spur gear member 70. As shown in FIGS. 10 and 12, cam lobes 76 and 78 are eccentric relative to the central opening 74, and in the preferred embodiment of the invention are 180° out of phase of each other. As shown in FIGS. 10–12, the central spur gear portion includes outer surface portions 70a and 70b, which cooperate with the blade mounts as more fully described herein.

Figure 13:
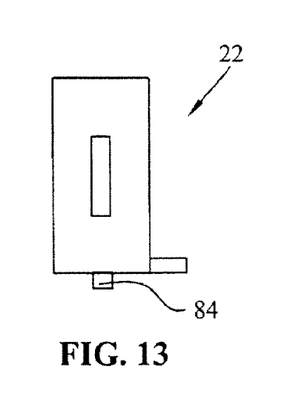
FIG. 13 is a side plan view of the guide for the reciprocating blade mounts.
Figure 14:
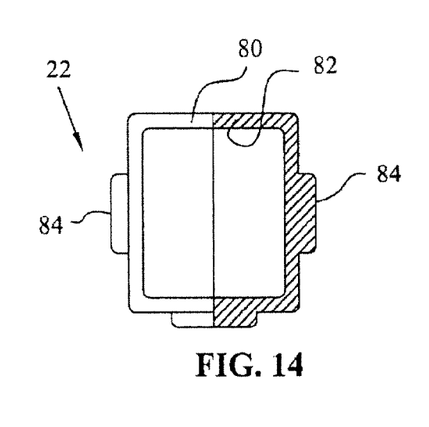
FIG. 14 is a front plan view of the guide of FIG. 13 shown partially in section.
Figure 15:
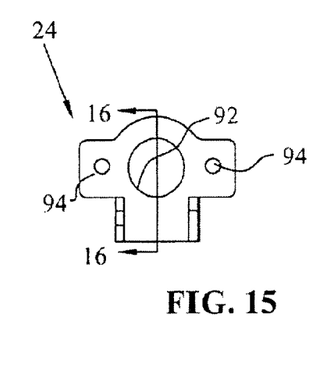
FIG. 15 is a front plan view of the mounting member for the cam of FIGS. 10–12.
Figure 16:
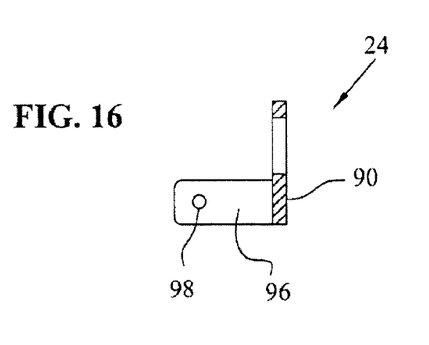
FIG. 16 is a cross-sectional view taken through lines 16—16 of FIG. 14.

With reference now to FIGS. 13 and 14, the guide member 22 for the reciprocating blade mount is shown in greater detail. The guides 22 include an outer peripheral bearing ring portion 80 having a generally rectangular internal surface 82 and outer locating lugs at 84. With reference now to FIGS. 15 and 16, bracket 24 will be described in greater detail. Bracket 24 includes a back plate portion 90 having a central opening at 92 with mounting holes at 94. The bracket 24 further includes two mounting arms at 96 having a pin receiving opening 98 in each arm.

Figure 18:
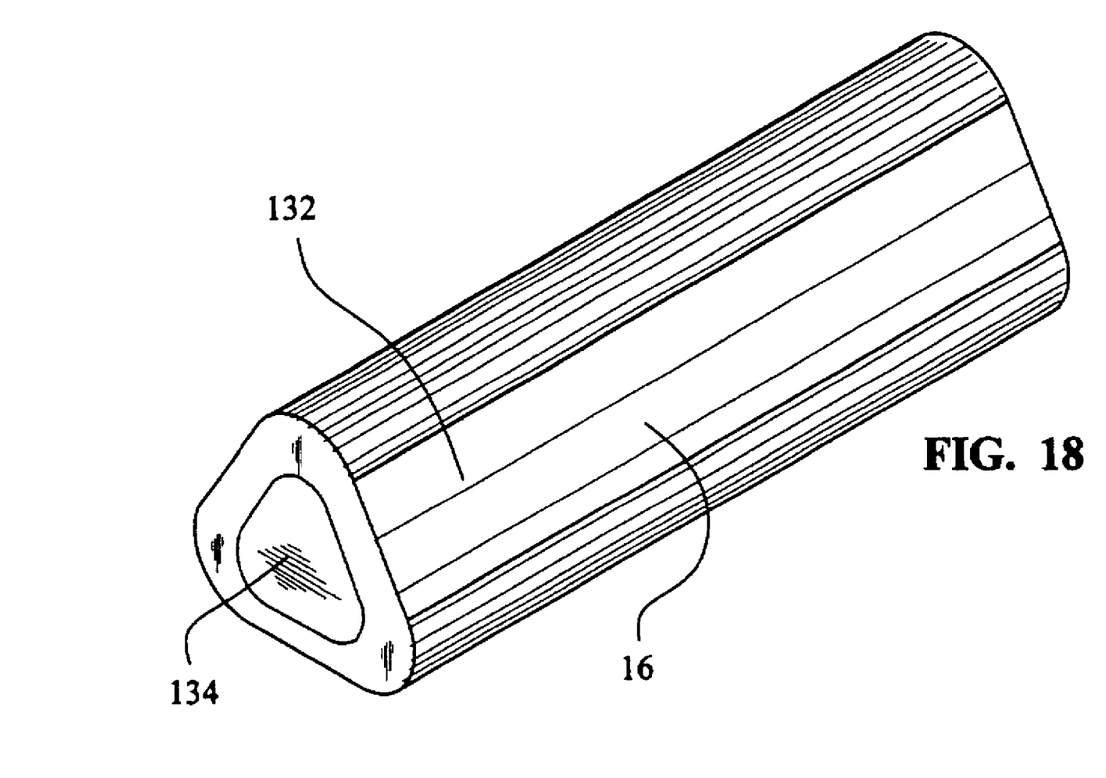
FIG. 18 is a perspective view of the rechargeable battery pack utilized in the operation of the carving knife.
Figure 19:
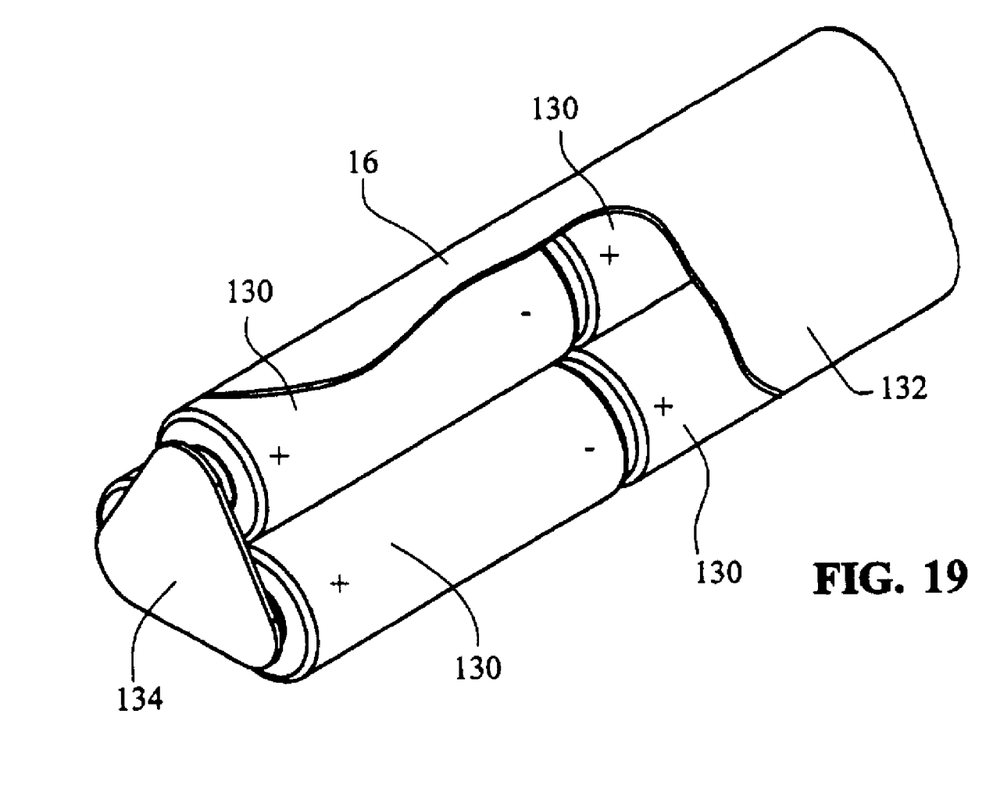
FIG. 19 is a perspective view of the rechargeable battery pack depicted in FIG. 18 with a portion of the shrink wrap covering cut away for illustrative purposes.

With respect now to FIGS. 18 and 19, the battery pack 16 is depicted in greater detail. Battery pack 16 includes six individual batteries 130, a shrink wrap covering 132, and end conductors 134. The batteries 130 may be comprised of any well known combination of compounds capable of producing electric current, such as Nickel Metal Hydride (Ni—MH). However, it is generally preferred that the chosen combination allow the batteries to be recharged upon the exhaustion of the electrical output of the batteries 130. The six batteries 130 are arranged in three pairs, with each pair aligned along a common longitudinal axis and the positive terminal of one battery 130 of the pair being in contact with the negative terminal of the other battery in the pair. The pairs are aligned longitudinally parallel to one another and arranged such that every pair is located within the valley present between the other two pairs.

An end conductor 134 is located at the end of each pair of batteries 130. Each of the end conductors 134 has a profile complementary to the cross-section of the battery pack and may be manufactured from any material well known that is capable of conducting an electric current. Generally, the side of end conductor 134 which is opposite the side in contact with the batteries 130 is coated with an insulating material.

Referring specifically to FIG. 19 wherein battery pack 16 is depicted with shrink wrap covering 132 partially cut away for illustrative purposes, it can be seen that shrink wrap covering 132 envelopes the three pairs of batteries 130 providing a rigidity to the structure and protecting the electrical continuity of the batteries 130. Further, shrink wrap 132 ensures battery pack 16 maintains a cross-section which is substantially an equilateral triangle with the individual batteries 130 comprising the points of the triangle. In addition, shrink wrap 132 also retains end conductors 134 in position located at the ends of the pairs of batteries 130. End conductors 134 are retained in contact with the conducting ends of batteries 130 and are oriented such that the conducting side is in contact with the batteries 130. This configuration allows the electrical circuitry (not shown) of the carving knife 2 to be electronically coupled to the end conductors 134 which are in turn electronically coupled to the all six batteries 130, thereby allowing the carving knife 2 to draw power from all six batteries 130 simultaneously.

In the preferred embodiment of the invention, each of the batteries is 1.2 volts each, defining a battery back of 7.2 volts. Furthermore, while each of the batteries preferably include the same amperage, the amperage of the battery pack can vary to vary the lifetime between charges for the pack. For example, if the batteries are 1500 milli-amps (ma), the lifetime is approximately 35 minutes; with 2200 ma, the lifetime is 45 minutes and with 2300 ma batteries, the lifetime is 60 minutes.

Figure 4:
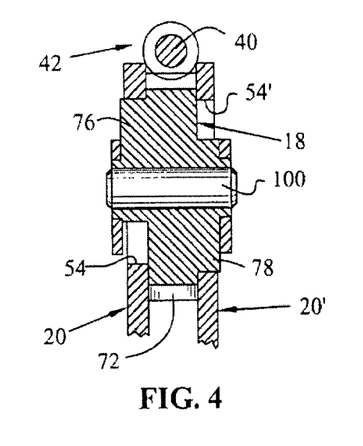
FIG. 4 is a cross-sectional view through lines 4—4 of FIG. 3.
Figure 5:
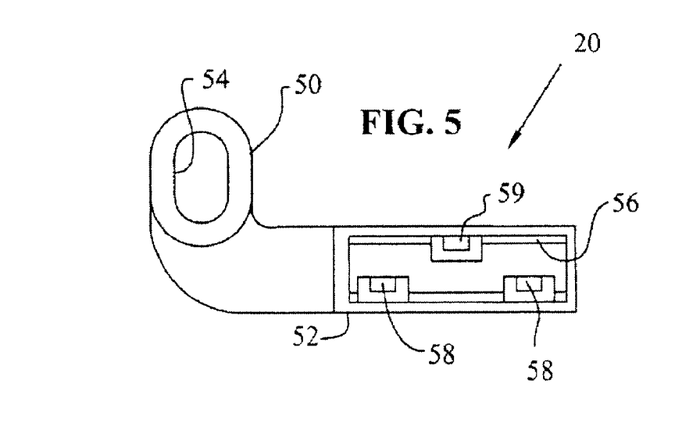
FIG. 5 is a side plan view of the left reciprocating blade mount, that is, the one viewed in FIG. 3.
Figure 6:
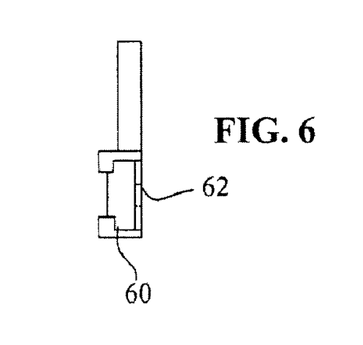
FIG. 6 is an end view of the reciprocating blade mount of FIG. 5.

With the various components as described above, the assembly of the carving knife 2 will be described as follows. The cam member 18 is first positioned between the two cooperable reciprocal blade mounts 20, 20' such that the cam lobes 76, 78 are situated in corresponding elongate slots 54, 54' as best shown in FIG. 4. It should be appreciated that the blade mounts 20, 20' are profiled, through tapered section 64, to overlap the cam member 18, and the lugs 58, 59, 58', 59' interdigitate as described above. The guides 22 for the reciprocal blade mounts 20, 20' may now be slidably received over an end thereof. The bracket 24 may be assembled to the cam by aligning apertures 98 of arms 96 (FIG. 15) with the central opening 74 (FIGS. 10–12) of the cam and slidably receiving a pin 100 (FIG. 4) through the arms 96 and through the central opening 74. The combination of the above-described assembly may now be positioned within the housing 4, together with the motor 14, such that the helical tooth 44 of the worm gear 42 meshes with the gears 72 of the cam member 18. Furthermore, guides 22 are positioned with their locating lugs 84 in corresponding locating slots 110 in the housing. It should be appreciated that the battery compartment 34 would include a contact mechanism (not shown) which would be wired to the motor member 14 together with the intermediate switch 6 as is well known in the art. It should also be appreciated that the handgrip section 12 of the housing 4 would include an end cap such as 120 to slidably receive a battery pack 16 therein. The assembly would be completed by enclosing the assembly described above with the housing half which forms part of the housing assembly 4.

As assembled, the battery-powered carving knife operates as follows. When the switch 6 is positioned in the ON position, the motor shaft 40 is driven which in turn drives worm gear 42. This causes engagement of the tooth 44 and teeth 72 of the cam member 18. Cam member 18 rotates about pin 100 causing eccentric cam lobes 76, 78 to eccentrically rotate around pin 100 within cooperating elongate slots 54, 54', thereby causing a reciprocation of the reciprocating blade mounts 20, 20'. As mentioned above, the reciprocating blade mounts 20, 20' reciprocate out of phase by 180°. FIG. 3 shows the end portion 30 of the blade 8 positioned in the gripping slot 56 so as to be held in place.

It should be appreciated then that the above-mentioned design is both very ergonomically designed as well as compact and lightweight. As best shown in FIG. 2, as the drive shaft of the motor 14 extends rearwardly, this allows the reciprocating blade mounts to reciprocate beneath the motor such that the length of the motor receiving compartment 10 needs only to be the length of the reciprocating blade mounts 20, 20', not the addition of the motor 14 and the reciprocating blade mounts 20, 20'. Moreover, as the motor 14 and the reciprocating blade mounts 20, 20' are positioned forward of the handgrip member 12, the weight of the motor 14, and the reciprocating blade mounts 20, 20' cause a moment in the same direction as that needed to carve the item to be cut assisting the blades 8 in the carving operation.

Figure 17:
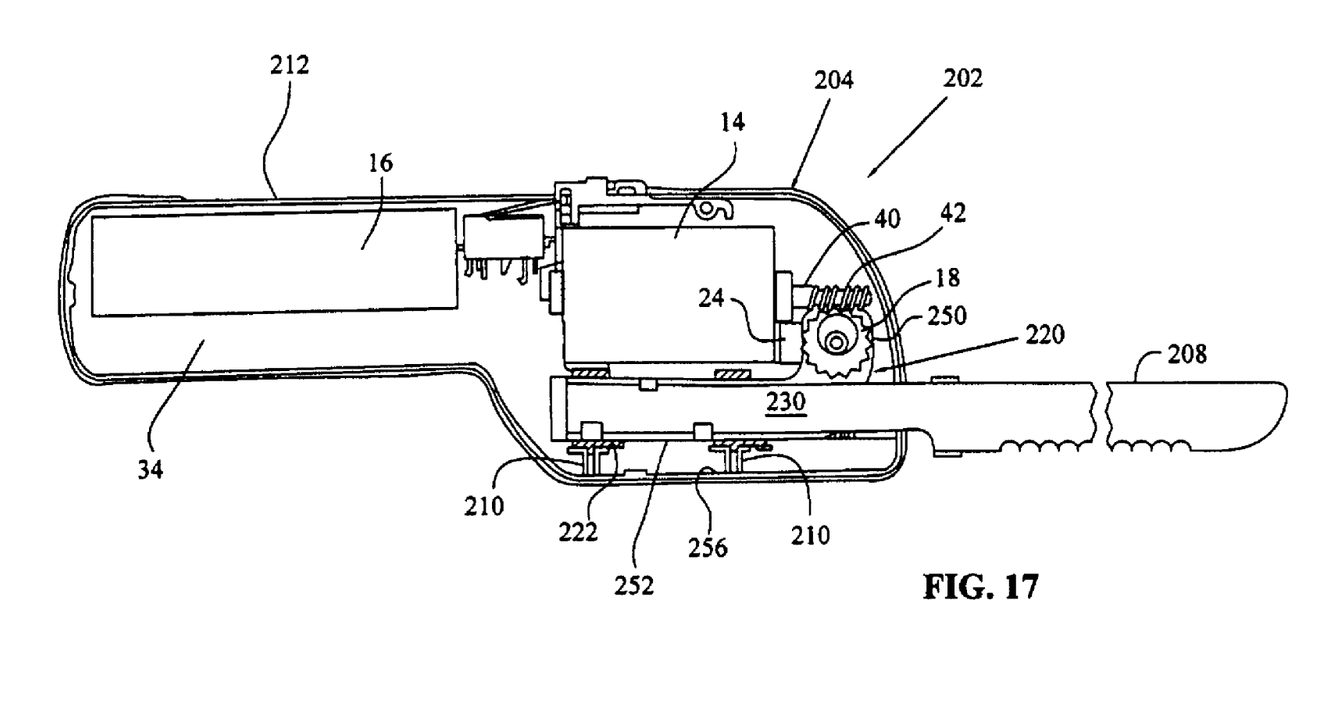
FIG. 17 is a view of another embodiment of a carving knife according to the present invention with one half of the outer housing removed.

In another embodiment of the invention, shown in FIG. 17, a battery-powered carving knife 202 is shown having a housing member 204 which is similar to housing member 4 as previously described. In this embodiment, the motor 14 is oriented so that the drive shaft 40 extends generally longitudinally projecting forwardly away from the handgrip section 212. The drive train is also repositioned to the forward section of the motor receiving section.

As described in the previous embodiment, the motor drive shaft includes the press fit worm gear 42 for driving cam member 18. Cam member 18 includes a central spur gear portion 70, which is meshed with the worm gear 42 as previously described. The cam member 18 has a central opening 74 about which it rotates and cam lobes 76 and 78 positioned on opposite sides of the central spur gear 70. Again, cam lobes 76 and 78 are eccentric to the opening 74 and are preferably oriented so that they are 180° out of phase with each other.

Similar to the previously described embodiment, L-shaped reciprocating blade mounts 220 are provided which include an upstanding foot portion 250 having an elongate slot (not shown) which is identical to that in the foot portion 50 of blade mount 20. Blade mount 220 also includes an elongate leg portion 252, and a tapered section, which is hidden in FIG. 17, that transitions from the elongate leg portion 252 to the foot portion 250. The elongate leg portion 252 includes a blade receiving area 256. As shown in FIG. 17, the blade mount 220 in this embodiment is oriented so that the elongate leg portion 252 extends rearwardly in the direction of the knife's grip section 212. So oriented, it will be appreciated that in this embodiment, the end section 230 of knife blade 208 is slightly longer than that of the previous embodiment so as to be properly engaged in the blade receiving area 256, which in this embodiment extends into the rear portion of the front motor receiving section. In other respects, the blade mount 220 is identical to that of the embodiment previously described.

Assembly is similarly achieved with the cam lobes 76, and 78 being received in the elongate slots of a cooperating pair of blade mounts. As in the previously described embodiment, a bracket 24 is provided to complete the assembly of the cam member 18 and blade mount 220, and for positioning the assembly within the housing. Guide members 222 are also provided for locating the elongate leg portion 252 of the blade mount 220 within the housing 204 using locating slots 210.

Operation of this embodiment of the invention is identical to that of the first described embodiment achieving the same ergonomic and operational benefits previously described. This embodiment maintains the positioning of the reciprocating blade mounts beneath the motor, maintaining the brevity of the motor receiving compartment.

Advantageously, in either of the embodiments of FIG. 2 or 17, the motor 14 and blade mounts, either 20 or 220, are positioned within the housing 4 or 204, such that they longitudinally overlap. This allows for a reduction in the overall length of the knife as described above. In either case, this also places the weight of the motor and blades forward of the handle, which accounts for a moment in a direction which will assist cutting or carving.

What I claim is:

1. An electric carving knife for carving meat or fish, the knife comprising:
    a housing having a front motor receiving section and a rear handgrip section, the handgrip section having a reduced cross-section as compared to the front motor receiving section;
    a pair of meat-carving knife blades mounted in said housing;
    a motor positioned in said front motor receiving section for driving the knife blades, said motor having a drive shaft extending rearwardly generally parallel to said rear handgrip section and said meat-carving knife blades;
    reciprocating blade mounts each having a substantially L-shaped configuration including an upstanding foot portion and an elongate leg portion extending substantially beneath said motor, said upstanding foot portions extending up from said elongate leg portions to and at least partially surrounding said drive shaft, said blade mounts being mounted in blade mount guides, said motor predominantly overlapping said guides in the direction of said drive shaft; and
    a battery pack positioned predominantly in the reduced cross-section handgrip section, said battery pack comprising a plurality of batteries arranged in series.

2. The electric knife of claim 1, wherein said batteries have substantially the same amperage, wherein said identical amperage can range between 1500 and 2300 ma, to provide multiple battery pack lifetime duration.

3. The electric carving knife of claim 1, further comprising a drive mechanism interconnecting said motor to the knife blades.

4. The electric carving knife of claim 3, wherein said drive mechanism drives the knife blades asymmetrically.

5. The electric knife of claim 4, wherein said drive mechanism comprises a worm gear attached to and driven by said motor drive shaft and a cam member driven by said worm gear, said cam member imparting reciprocating movement to said blade mounts.

6. The electric knife of claim 5, wherein said worm gear is attached to said motor drive shaft and rotates about a longitudinal axis.

7. The electric knife of claim 6, wherein said cam member is comprised of a spur gear meshing with said worm gear, and rotating about an axis transverse with said longitudinal axis.

8. The electric knife of claim 7, wherein said cam member includes cam lobes positioned on opposite side of said spur gear, said cam lobes being eccentric relative to said transverse axis and 180° out of phase relative to each other.

9. The electric knife of claim 8, wherein said reciprocating blade mounts are each substantially L-shaped to include an upstanding foot portion and an elongate leg portion, said upstanding feet portions having elongate slots which overlap said cam lobes.

10. The electric knife of claim 9, wherein said motor is positioned with said drive shaft extending rearwardly, towards said elongate handle, and said upstanding feet portions extend upwardly towards said motor drive shaft, and said elongate leg portions of said reciprocating blade mounts extend forwardly and include blade mounting sections situated adjacent the forward section of said front motor receiving section, and said front motor receiving section including an access opening, accessing said blade mounting sections.

11. The electric carving knife of claim 1, wherein said batteries are arranged in an elongate stack.

12. The electric carving knife of claim 11, wherein said battery pack is comprised of six batteries, arranged in two stack[s] of three batteries, where each stack of three batteries are configured in a triangular configuration.

13. The electric carving knife of claim 12, wherein said battery pack is at least substantially encapsulated within an insulating covering.

14. The electric carving knife of claim 1, wherein said individual batteries are comprised of Nickel Metal Hydride.

15. The electric carving knife of claim 14, wherein said Nickel Metal Hydride batteries are approximately 1.2 volts each.

* * * * *